E. BOWMAN & J. A. WALLACE.
WATER PURIFIER.
APPLICATION FILED OCT. 5, 1909.
986,897.
Patented Mar. 14, 1911.
2 SHEETS—SHEET 2.
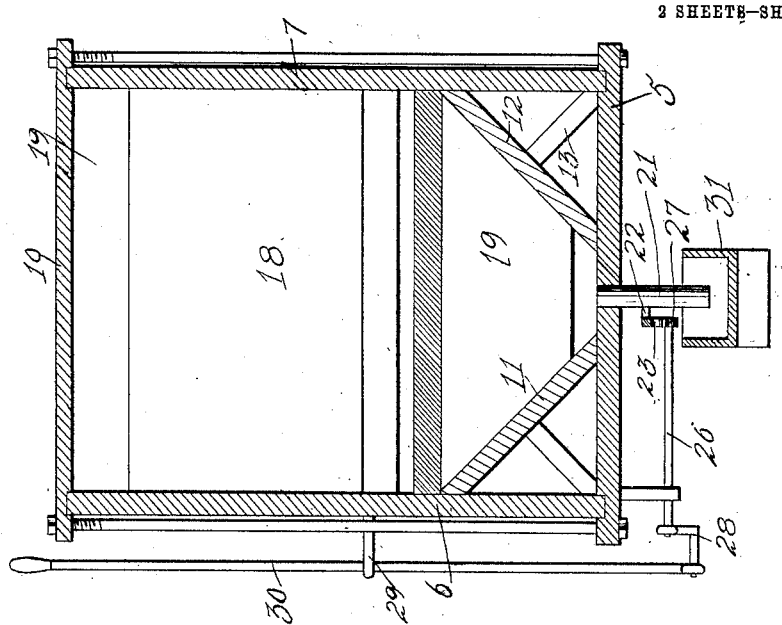
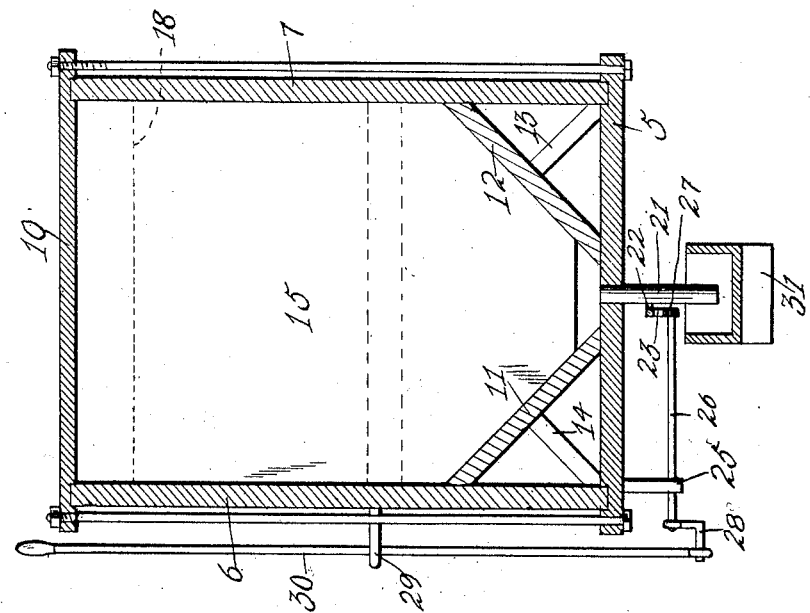
Witnesses
Inventors
Edward Bowman
Joseph A. Wallace
By Chandler & Chandler
Attorneys

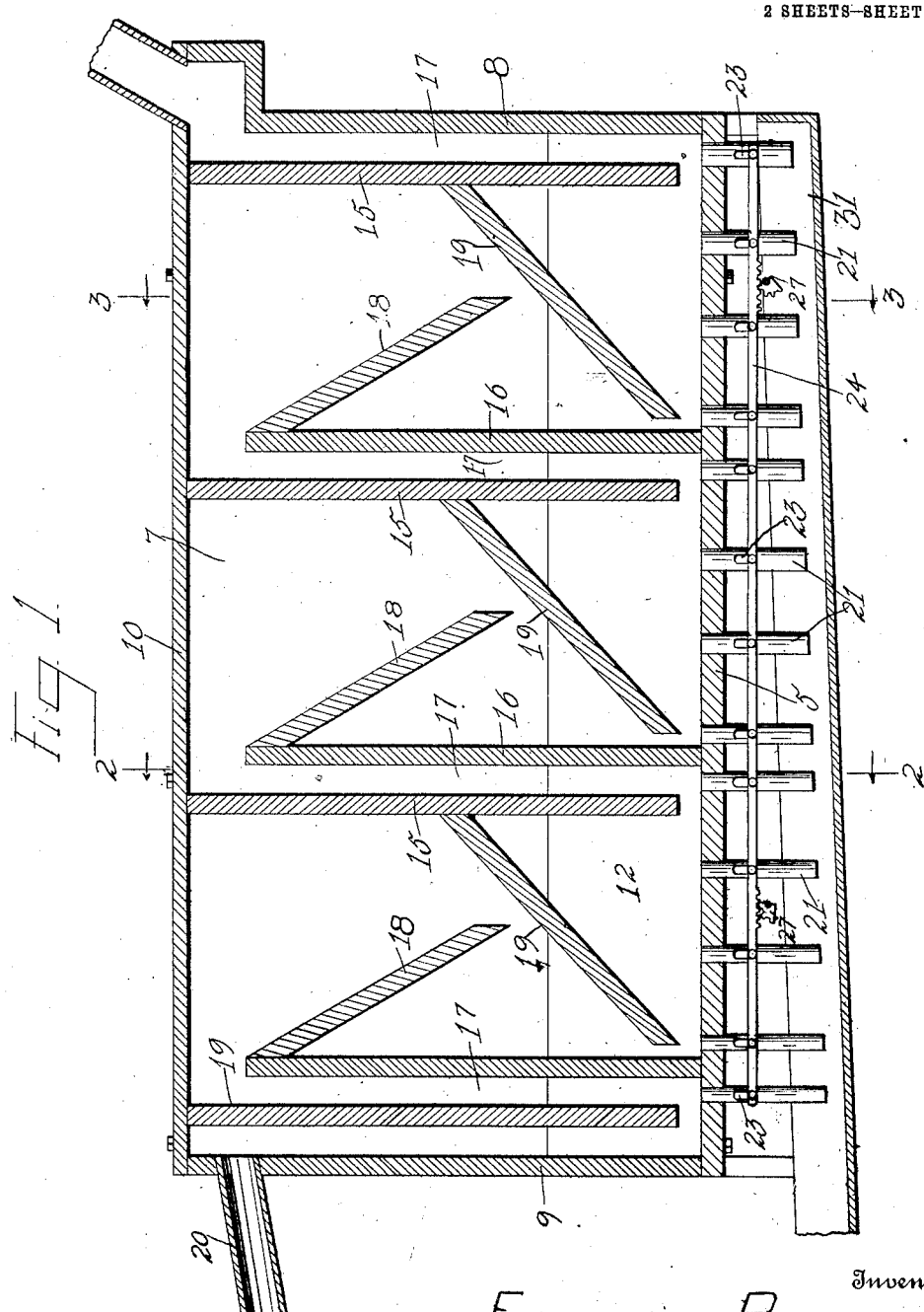

UNITED STATES PATENT OFFICE.

EDWARD BOWMAN AND JOSEPH A. WALLACE, OF McGILL, NEVADA.

WATER-PURIFIER.

986,897. Specification of Letters Patent. Patented Mar. 14, 1911.

Application filed October 5, 1909. Serial No. 521,119.

*To all whom it may concern:*

Be it known that we, EDWARD BOWMAN and JOSEPH A. WALLACE, citizens of the United States, residing at McGill, in the county of White Pine, State of Nevada, have invented certain new and useful Improvements in Water-Purifiers; and we do hereby declare the following to be a full, clear, and exact description of the invention, such as will enable others skilled in the art to which it appertains to make and use the same.

This invention relates to improvements in water purifiers and has for one of its objects the provision of a device of that kind so constructed that the sand or other refuse from the water may be readily precipitated in and discharged from the purifier.

Another object is the provision of a pair of baffle plates so arranged that the particles of sand or other foreign matter in the water will be prevented from rising in the several compartments of the purifier.

With these and other objects in view as will more fully hereinafter appear, the present invention consists in certain novel details of construction and arrangement of parts, hereinafter fully described, illustrated in the accompanying drawings and more particularly pointed out in the appended claim, it being understood that various changes in the form, proportion, size and minor details of the device may be made without departing from the spirit or sacrificing any of the advantages of the invention.

In the accompanying drawings forming part of the specification:—Figure 1 is a longitudinal sectional view of the device. Fig. 2 is a transverse sectional view of the same on the line 2—2 of Fig. 1. Fig. 3 is a similar view on the line 3—3 of Fig. 1.

Similar numerals of reference are employed to designate corresponding parts throughout.

The device consists of a casing having a bottom plate 5, oblong in contour and from the opposite sides of which rise the side walls 6 and 7 and from the opposite ends of which rise the end walls 8 and 9. In the present instance a top 10 is shown bearing on the upper edges of the side and end walls; the use of this member however, will be optional since it will be understood, from what will appear later, how the device might operate without the use of a top or cover 10.

Arranged longitudinally of the tank are a pair of oppositely arranged side or bearing plates 11 and 12. These members incline upwardly and outwardly from the bottom 5 and their lower edges are secured to the latter and on opposite sides of the longitudinal central line thereof, while their upper sides are secured to the opposed inner faces of the side walls 6 and 7. With this construction it is evident that a pitch is given the bottom. The plates 11 and 12 are further supported by means of a pair of struts 13 and 14, the opposite ends of which are secured to the inner faces of the plates and at the corners formed by the juncture of the bottom and side plates.

As shown in Fig. 1, the tank or casing is interiorly divided into three compartments. It must be understood however, that we are not to be limited to this specific number of compartments since it will be evident, from what will appear later, how a greater or less number of compartments might be formed without departing from the spirit of the invention. Each of the compartments is formed of a pair of oppositely arranged walls or partitions 15 and 16.

By referring to Fig. 1 it will be seen that the compartment at the right end of the casing is formed by positioning the partition or wall 15 at a slight distance in advance of the end wall 8. The partition 15 is slightly less in length than the distance between the bottom plate 8 and upper edges of the side and end walls so that when it is secured in position with its upper end coincident with the upper edges of the side and end walls a space will exist between its lower end and the bottom plate 5. So also will a space 17 exist between the partition and adjacent end wall. This space 17 will constitute an inlet and the space between the lower end of the partition 15 and bottom plate, an opening for the admission of the liquid from the space 17 to the opposite side of the partition. The lower end of the partition 15 is formed to bear on the upper faces of the plates 11 and 12 and its opposite sides are fixedly secured to the opposed inner faces of the side plates 6 and 7. The opposite partition 16 is spaced from the partition 15 for a considerable distance, and corresponds approximately in length to the length of the partition 15. The lower end of the partition 16 is formed to bear on the plates 11 and 12 and also on the bottom plate 5, and when so positioned its upper end will be considerably below the plane of the upper edges of the partition 15, side and end walls. Thus it will be seen that water flowing through the inlet 17 and into the compartment formed by the partitions 15 and 16, will rise in the said compartment to the height of the partition 16 whereupon it will flow over the said partition and through the succeeding compartments.

Reference now to Fig. 1 discloses the fact that each of the compartments are interiorly provided with a pair of baffles designated by the numerals 18 and 19. These members are secured to the opposed inner faces of the partitions 15 and 16 and are so positioned that the sand or other foreign matter in the water flowing through the several compartments will be held and prevented from flowing through the outlet end of the purifier. The baffle 19 is carried by the partition 15 and has its upper side fixedly secured to the intermediate portion of said partition and on the inner face thereof. The baffle 19 extends downwardly and outwardly to a point in a plane with the lower edge of the partition 15 and is spaced from the opposite partition 16 for a distance equal to the space between the lower edge of the partition 15 and bottom 5, or substantially so. The opposite baffle 18 is carried by the partition 16 and has its upper side fixedly secured to the inner face and adjacent the upper end of the partition 16 and extends downwardly and outwardly to a point adjacent the intermediate portion of the upper face of the baffle 19, the space between the edge of the baffle 18 and face of the baffle 19 corresponding approximately to the space between the partition 15 and bottom 5. With this construction it is obvious when the liquid enters the inlet 17 and flows into the compartment formed by the partitions 15 and 16 it will rise in the pocket formed by the baffle 19 and work its way through the opening between the lower end of the said baffle and adjacent the partition 16 and thence upwardly and into the pocket formed by the baffle 18 and partition 16 and thence through the opening between the lower end of the baffle 18 and baffle 19 and over the upper edge of the partition 16. Thus it will be seen as the water flows through the compartments that the heavier grains of sand and other foreign matter, will be first collected in the first compartment and the lighter particles flowing over and into the second compartment whereby the operation just described will be effected and tend to rid the water of the lighter grains of sand and the like. It is evident with this construction that after the water has passed through three or more of these compartments it will be completely rid of all foreign matter.

The outlet pipe is designated by the numeral 20 and is located adjacent the upper end of the end wall 9 and at a point in a plane with the upper edges of the partitions 16.

By referring now to Figs. 1 to 3 inclusive it will be seen that depending from the bottom 5 between the plates 11 and 12 are a plurality of outlet tubes 21. These members decrease in diameter from the inlet end of the casing and are each provided with a cut-off valve. The cut-off valves are provided with valve stems 22, which terminate in crank handles 23. The valve stems 22 and crank handles 23 are all arranged on the same side of the outlet pipe and are connected together by a single connecting rod or link 24. By reference now to Figs. 2 and 3 it will be seen that depending from the outer side of the bottom 5 is a bracket 25, the lower end of which extends to a point in a plane with the link 24, and journaled in this bracket arm is a shaft 26, the inner end of which has keyed or otherwise secured thereto a quadrant 27, the teeth of which mesh with the teeth formed on the lower side of one portion of the link 24. The opposite end of the shaft 26 is provided with a crank handle 28. Projecting laterally from the intermediate portion of the outer face of the side wall 6 of the casing is a pivot pin 29 and journaled on this pivot pin is the intermediate portion of an operating lever 30, the lower end of which is journaled on the crank handle 28 and the upper end of which extends to a point above the upper edge of the side wall 6 and within easy reach of the operator. With this construction it is obvious when the lever 30 is moved in one direction that the shaft 26 will be rotated through the crank handle 28 whereby the links 24 will be moved longitudinally, thus turning the crank handle 23 at the outer ends of the valve stems and opening the valves, whereby the sand or other matter in the bottom of the tank will flow through the outlet tubes 21.

An inclined trough or chute 31 is positioned below the outlet tubes 21 and receives the matter flowing through said tubes and directs it to a suitable receptacle.

What is claimed as new, is:—

The herein described water purifier comprising a casing, a chamber therein, spaced partitions at opposite sides of the chamber forming inlet and outlet channels, the former discharging into the bottom and the latter leading from the top of said chamber, oppositely inclined baffles in said chamber disposed at different elevations and one overhanging the other, and means for discharging sediment from the bottoms of said chamber and said channel, said means comprising a plurality of discharge tubes, a valve in each discharge tube, a crank handle operatively connected to each valve, a link connecting all of said crank handles, ratchet teeth formed on the lower edge of said link, a bracket supported by said casing, a shaft journaled in said bracket a toothed member mounted eccentrically on said shaft and operatively engaging the teeth on the link and means for rotating said shaft.

In testimony whereof, we affix our signatures, in presence of two witnesses.

EDWARD BOWMAN.
JOSEPH A. WALLACE.

Witnesses:
J. D. WALLACE,
H. AULT.